United States Patent [19]

Schickling et al.

[11] 3,971,565
[45] July 27, 1976

[54] SEAL ASSEMBLY FOR PILLOW BLOCK HOUSING

[75] Inventors: Joseph H. Schickling, Collegeville; John L. Blake, Jr., Willow Grove; Walter Hyduk, Southampton, all of Pa.

[73] Assignee: SKF Industries, Inc., King of Prussia, Pa.

[22] Filed: May 27, 1975

[21] Appl. No.: 581,384

[52] U.S. Cl.................................. 277/59; 277/66; 277/178; 277/136; 308/187.1
[51] Int. Cl.².......................................... F16J 15/32
[58] Field of Search .............. 277/59, 66, 178, 136; 308/187.1

[56] References Cited
UNITED STATES PATENTS

| | | | |
|---|---|---|---|
| 2,983,529 | 5/1961 | Price............................ | 308/187.1 X |
| 3,656,824 | 4/1972 | Ulberg.................................. | 277/66 |
| 3,726,531 | 4/1973 | Pagan et al. .......................... | 277/59 |
| 3,869,131 | 3/1975 | Derner.................................. | 277/59 |

Primary Examiner—Samuel B. Rothberg
Attorney, Agent, or Firm—Seidel, Gonda & Goldhammer

[57] ABSTRACT

A nonrotatable seal assembly is provided for use with a conventional pillow block housing to form a positive barrier to prevent the entry of foreign contamination. The seal assembly has a thin body portion provided with two peripheral grooves each adapted to receive a rib on a wall of the pillow block housing with a deformable sealing member on the outer periphery of said body portion between the grooves. Said seal assembly has a pin extending into the wall of the pillow block housing to prevent relative rotation therebetween. A thicker body portion of the seal assembly contains a lubrication recess between first and second seals with a conventional lubrication fitting communicating with said recess.

11 Claims, 7 Drawing Figures

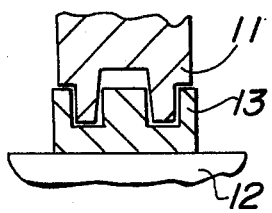
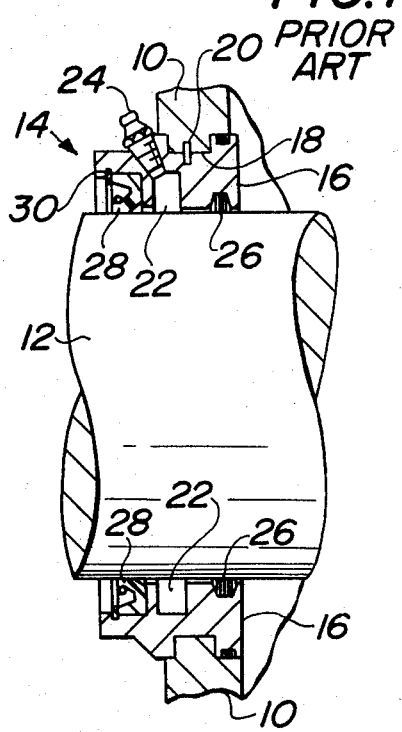
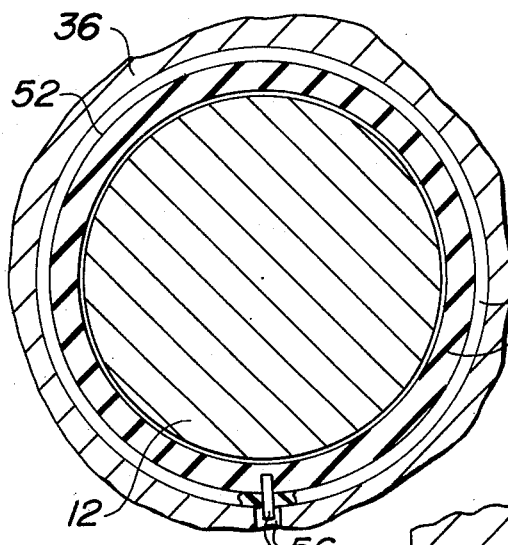
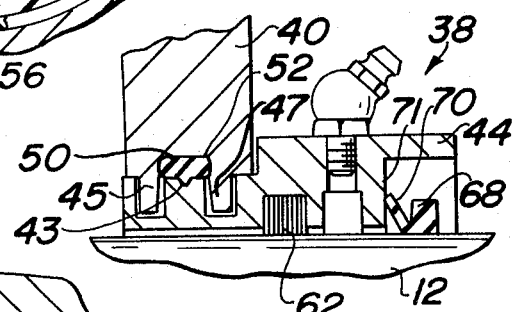
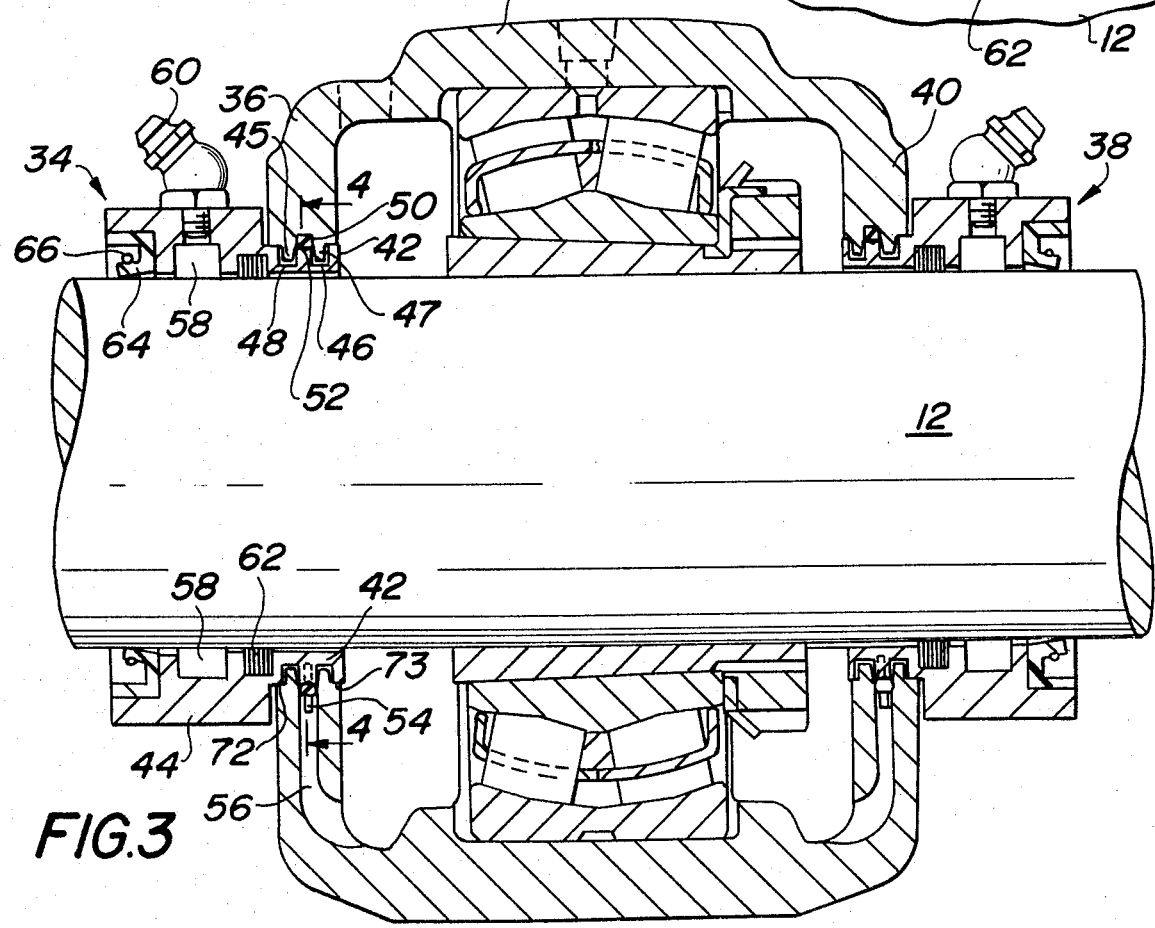

SEAL ASSEMBLY FOR PILLOW BLOCK HOUSING

BACKGROUND

A wide variety of seal assemblies have been proposed heretofore for use in connection with a conventional split pillow block housing adapted to support a rotating shaft.

One such seal assembly is rotatable with the shaft and has a pair of peripheral grooves on its outer periphery with each groove receiving a rib on a wall of a conventional pillow block housing. The body of said seal assembly has an axial length which is only slightly greater than the thickness of the pillow block wall and is of a uniform wall thickness except for the grooves on its outer periphery.

An example of a nonrotatable seal assembly proposed heretofore for use with a pillow block housing included a body pinned to the wall of the pillow block housing. The body of the seal assembly included on its inner periphery a lubrication recess between first and second seals. In order to use that seal assembly, it is necessary to provide a special pillow block housing or machine that wall of a conventional pillow block housing so that it can receive the seal assembly.

The present invention is directed to a nonrotatable seal assembly which may be readily substituted for said rotatable seal assembly in a conventional pillow block housing without the need for machining the pillow block assembly, special tools for mounting the seal or special skills on the part of the installer.

DISCLOSURE

This invention is directed to a nonrotatable seal assembly for use with a conventional pillow block assembly. The seal assembly includes a cylindrical body having an axial length substantially greater than the thickness thereof. The cylindrical body of the seal assembly is thinner in a radial direction at a first end portion as compared with the thickness at a second end portion thereof.

The first end portion of said cylindrical body is provided with two spaced grooves on its outer periphery. Each groove is adapted to receive an annular rib on a wall of a conventional pillow block housing. A deformable sealing member is provided on the periphery of said body at said first end portion between said grooves. A pin means secures said seal to said body between said grooves. Said pin means has a portion which projects radially from said sealing ring outer periphery for entry into a passage or opening provided in the wall of a conventional pillow block housing. The inner peripheral surface of said first end portion being a smooth uninterrupted surface allowing the additional use of a long small clearance labyrinth.

The inner peripheral surface of said body at said second end portion is provided with a lubrication recess positioned on said body for communication with said recess. The inner peripheral surface of said body is uniform with the portion of said inner peripheral surface at said first end being smooth and uninterrupted. The inner peripheral surface of said body has a diameter which is slightly greater than the inner peripheral diameter of said first and second seals.

In a preferred embodiment of the present invention, one of the two seals on the second portion of the cylindrical body is located approximately equidistant from the ends of the body. The other seal on said second portion of the body is preferably at one end thereof and is a lip seal so that it may facilitate purging of contaminants that may collect over a period of time in the lubrication recess.

In another embodiment a face seal is used in place of the lip seal and rotates with the shaft.

For the purpose of illustrating the invention, there is shown in the drawings forms which are presently preferred; it being understood, however, that this invention is not limited to the precise arrangements and instrumentalities shown.

FIGS. 1 and 2 are partial sectional view of a pillow block housing containing prior art seal assemblies.

FIG. 3 is a sectional view through a pillow block housing containing a seal assembly in accordance with the present invention but on a larger scale than FIGS. 1 and 2.

FIG. 4 is a sectional view taken along the line 4—4 in FIG. 2.

FIG. 5 is a sectional view similar to the right hand end portion of FIG. 3 but illustrating another embodiment of the present invention.

Figure 6:
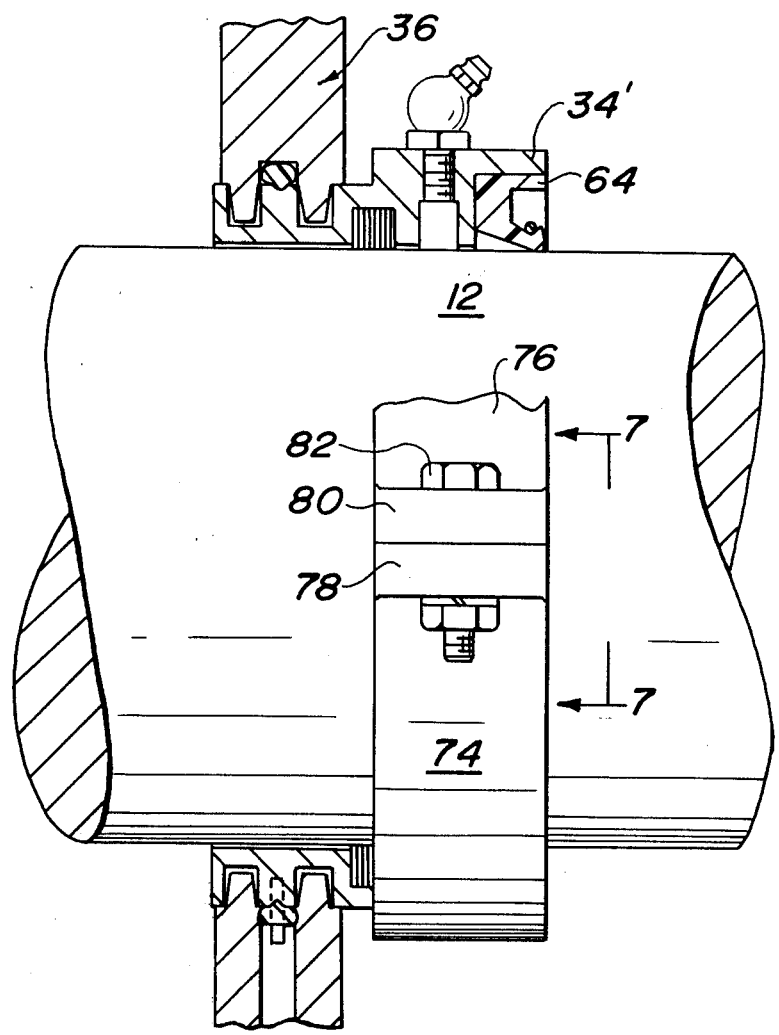
FIG. 6 is a sectional view of another embodiment.

Referring to the drawing in detail, wherein like numerals indicate like elements throughout the several views, there is shown in FIG. 1 a prior art seal device of the nonrotatable type designated generally as 14 and mounted in an end wall 10 of a split pillow block housing through which a rotatable shaft 12 extends.

The seal assembly 14 includes a body 16 having a peripheral groove 18 receiving a rib on the wall 10. The rib on the wall 10 was attained by grinding or otherwise machining opposite faces of the wall 10 of a conventional pillow block assembly. A pin 20 extends into drilled holes in the body 16 and wall 10 to prevent relative rotation therebetween.

The seal assembly 14 includes a lubrication recess 22 on its inner peripheral surface. The recess 22 is approximately equidistant from the ends of the seal assembly 14. A lubrication fitting 24 is supported by the body 16 and communicates with the recess 22. Recess 22 is located between a first seal 26 and a second seal 28. Seal 28 is retained in the body 16 by a snap ring 30. It is to be noted that any contaminants that pass under seal 26 are received substantially immediately within the pillow block assembly.

In FIG. 2, there is illustrated another prior art seal device that includes a rotatable seal assembly 13. The seal assembly is associated with a wall 11 of a conventional pillow block housing. The seal assembly 13 includes a pair of spaced grooves on its outer peripheral surface with each groove receiving an annular rib projecting from the wall 11. The seal assembly 13 is annular so that a shaft 12 may extend therethrough. Wall 10 of FIG. 1 corresponds to wall 11 of FIG. 2 after the grinding or machining step referred to above. While the rotatable seal assembly functions well in its intended use, additional sealing is desirable in environments wherein contamination levels are high.

In FIG. 3 there is illustrated a cross-sectional view through a conventional split pillow block housing 32 which surrounds the rotatable shaft 12. The pillow block housing 32, in a conventional manner is made of upper and lower halves which are bolted together for supporting shaft 12. The housing 32 also includes a conventional bearing and mounting accessories. The housing 32 has an end wall 36 which is identical to end wall 11 shown in FIG. 2 and which receives a seal assembly 34 constructed in accordance with the present invention. The other end wall of the housing 32 is designated as 40 and receives a seal assembly 38 in accordance with the present invention. The seal assemblies 34 and 38 are identical. Accordingly, only seal assembly 34 will be described in detail.

The seal assembly 34 has a cylindrical body comprised of first and second portions. The first portion of the body is designated 42 and the second portion is designated 44. Body portion 44 is preferably, but not necessarily, substantially longer in an axial direction than body portion 42 and has a radial thickness which is substantially greater than the thickness of body portion 42.

Body portion 42 is provided with spaced grooves 46 and 48 on its outer peripheral surface defining land portion 52 therebetween. Grooves 46 and 48 are adapted to receive therein ribs 45 and 47, respectively on the wall 36 of the pillow block housing 32. The complete seal assembly 34 is piloted on the lands 72 and 73 in wall 36 which centers the assembly and assures concentricity of seals 62 and 64 (to be described hereinafter) with the shaft 12. A sealing ring 50 of a deformable resilient material such as rubber having a soft durometer surrounds the land portion 52 and may be integrally secured thereto by any conventional means. Land portion 52 may or may not have a groove or slight depression 43 (see FIG. 5) thereon to act as a locater for sealing ring 50.

The space between the land portion 52 and the juxtaposed surface on the wall 36 is less than the radial thickness of the sealing ring 50 whereby said sealing ring 50 is deformed into intimate sealing contact with said land portion 52 and the juxtaposed portion of the wall 36 between the ribs thereon. Further, the sealing ring 50 is sufficiently deformed so that it intimately contacts the side faces of ribs 45 and 47 so that the seal 50 completely fills the void above and adjacent land 52 (see FIG. 5). The deformable seal 50 is oversized to accommodate variations in the manufacturing tolerances in wall 36 of pillow block housing 32.

Pin means such as a pin 54 extends through seal 50 into a drilled hole one the land portion 52 and a passage or opening 56 in wall 36 to prevent relative rotation between said seal assembly 34 and the pillow block housing 32. In a conventional pillow block housing 32, the passage 56 is a lubrication drain passage which effects return of escaping lubricant to the housing 32 when seal shown in FIG. 2 is employed. Pin 54 extends through and projects radially inwardly and outwardly of the sealing ring 50 (see FIGS. 3 and 4). When sealing ring 50 which may be rectangular in section has a radial thickness of 3/16 inches, pin 54 may be a steel pin about 1/16 of an inch in diameter and about ½ inch long. Such dimensions will vary with the size of the seal assembly 34. Seal 50 may have other shapes if desired.

The entirety of the body portion 44 is outside of the pillow block housing 32. A lubrication recess 58 is provided on the inner periphery of the body portion 44. The body portion 44 on its inner periphery is provided with a first seal 62 on one side of the lubrication recess 58 and a second seal 64 on the other side of the lubrication recess 58. A lubrication fitting 60, which may be conventional, is supported by the body portion 44 in communication with the recess 58.

The seal 62 is preferably a broad face seal and may be comprised of felt having a width in an axial direction corresponding to the radial thickness. The seal 64 is located in a recess or groove at the end of the body portion 44 remote from the pillow block housing 32. Seal 64 is preferably a resilient material having a flexible lip in sealing contact with the outer periphery of the rotatable shaft 12. The lip on seal 64 is biased radially inwardly by a coil spring 66. Any contaminants which accumulate in the lubricant disposed within recess 58 may be forced out of recess 58 by introducing clean lubricant by way of fitting 60 which will force the lip on seal 64 to pivot radially outwardly to effect a purge.

Any contaminants that do escape past seal 62 must travel the entire length of body portion 42 before entering pillow block housing 32. The substantial length of body portion 42 helps to retard movement of the contaminants and thereby aids in preventing contaminants from reaching the interior of housing 32.

Figure 7:
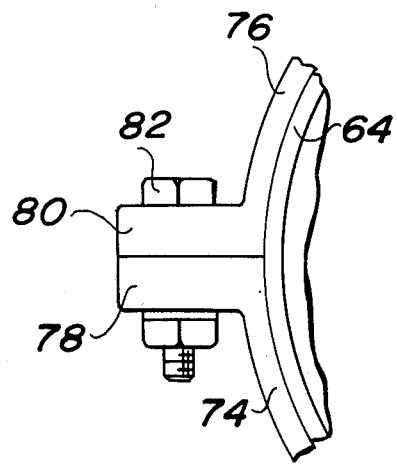
FIG. 7 is a view taken along the line 7—7 in FIG. 6.

While the seal assembly is preferably comprised of a body made from metal and in one integral piece, it may be made from high strength plastic or be made in the form of split halves. Thus, see FIGS. 6 and 7 wherein the seal assembly 34' has a cylindrical body defined by split semi-circular halves 74 and 76. The halves 74 and 76 have ears 78 and 80, respectively at diametrically opposite portions. The mating ears 78 and 80 are removably fastened together by a threaded fastener means such as bolt 82. Seal assembly 34' is otherwise identical with seal assembly 34 and is adapted to be received in wall 36 as described above.

The seal assembly of the present invention previously discussed advantages over seal assembly 14 in addition to the very important feature wherein it can be readily substituted for the rotatable seal 13 in service without stripping the entire shaft to prevent the entry of foreign contamination into or through the pillow block housing 32. Further, seal assembly 13 may be substituted for seal assembly 34 or 38 where desired. It will be apparent to those skilled in the art that the pillow block housing 32 may be provided with a seal assembly 34 in accordance with the present invention at one end while having seal assembly 13 or a standard end plug at the other end.

Relative rotation between the seal assembly 34 and the pillow block housing 32 is prevented by the pin 54. The sealing ring 50 provides further sealing to prevent contamination. Either of the seal assemblies 34 and 38 may be modified in a manner whereby a face seal can be substituted for the lip seal 64.

Thus, see FIG. 5 wherein the seal assembly 38 has a face seal 68 of resilient material in the recess which formerly contained the seal 64. Seal 68 has a flexible lip 70 which contacts a smooth outer wall 71 on the second body portion 44 and can be used with a rough shaft surface not suitable for seal 64. Seal 68 rotates with shaft 12 while lip 70 maintains contact with stationary wall 71. Thus, purging of contaminants can be attained with the alternative embodiment shown in FIG. 5 as hinged lip 70 will move toward the main body portion of seal 68 as lubricant is introduced into recess 58. Movement of hinged lip 70 will permit contaminants to be purged from recess 58. Lip 70 has sufficient flexibility to remain in contact with wall 71 even though slight lateral movement of seal 68 may occur. All other components of the embodiment shown in FIG. 5 are identical with the embodiment set forth in FIGS. 3 and 4.

Assembly is preferably accomplished by separating the halves of the housing 32 and telescoping the seal assembly over shaft 12. The exposed portion of pin 54 is inserted into passage 56. Then the upper half of housing 32 is applied to its lower half supporting seal assembly 34 on lands 72 and 73 and at the same time deforming ring 50 so that it seals passage 56 and is in good sealing contact with wall 36, land portion 52, and adjacent portions of ribs 45 and 47.

The present invention may be embodied in other specific forms without departing from the spirit or essential attributes thereof and, accordingly, reference should be made to the appended claims, rather than to the foregoing specification as indicating the scope of the invention.

We claim:

1. A nonrotatable seal assembly for use in a pillow block comprising
   a. a cylindrical body having a length in an axial direction which is substantially longer than the thickness thereof in a radial direction, said body having a first end portion longitudinally spaced from a second end portion,
   b. said first end portion having two spaced grooves on its outer periphery, each groove being adapted to receive an annular rib on a pillow block housing,
   c. a deformable sealing ring on the outer periphery of said body at said first end portion between said grooves,
   d. a pin means extending through said deformable sealing ring into said body, said pin means including a portion projecting from said sealing ring outer periphery for entry into a passage or opening in a pillow block,
   e. said cylindrical body being hollow, the inner peripheral surface of said body at said second end portion having a lubrication recess positioned between first and second annular seals, a lubrication fitting on said body communicating with said recess, and
   f. the inner peripheral surfaces of said first end portion being a smooth uninterrupted surface having a diameter slightly greater than the inner diameter of said first and second seals.

2. A seal in accordance with claim 1 wherein said body is thinner in a radial direction at said first end portion as compared with a corresponding dimension at said second end portion.

3. A seal in accordance with claim 2 wherein the axial length of said second body portion is greater than the axial length of said first body portion, and said pin means includes a pin extending radially through said deformable sealing ring with a portion of said pin extending into a mating cavity on the outer periphery of said first body portion between said grooves.

4. A seal in accordance with claim 1 wherein said first seal is a broad face seal having a sealing surface across its axial width, said second seal being a lip seal to permit purging of contaminants in a lubricant from said recess when additional lubricant is introduced into the recess by way of said fitting.

5. A seal in accordance with claim 1 including a pillow block housing having an apertured wall, said wall having a pair of annular ribs extending into said grooves, said wall having a passage or opening between said ribs and into which extends said projecting portion of said pin means to prevent rotation of said cylindrical body with respect to said wall.

6. A seal in accordance with claim 1 wherein said second seal is a face seal having a flexible lip in contact with said second body portion at one end thereof.

7. A nonrotatable seal assembly for use in a pillow block comprising
   a. a cylindrical body having a length in an axial direction which is substantially longer than the thickness thereof in a radial direction, said body being thinner in a radial direction at a first end portion as compared with a corresponding dimension at a second end portion, the axial length of said second body portion being greater than the axial length of said first body portion,
   b. said first end portion having two spaced grooves on its outer periphery, each groove being adapted to receive an annular rib on a pillow block housing,
   c. a deformable sealing ring of resilient material on the outer periphery of said body at said first end portion between said grooves,
   d. a pin extending through said deformable sealing ring into said body, said pin extending radially through said sealing ring and including a portion projecting from said deformable sealing ring outer periphery for entry into a passage or opening in a pillow block,
   e. said cylindrical body being hollow, the inner peripheral surface of said body at said second end portion having a lubrication recess positioned between first and second annular seals, a lubrication fitting on said body communicating with said recess, said first seal being a broad face seal having a sealing surface across its axial width, said second seal being a lip seal to permit purging of contaminants in a lubricant from said recess when additional lubricant is introduced into the recess by way of said fitting, and
   f. the inner peripheral surface of said body having a diameter slightly greater than the inner diameter of said first and second seals.

8. Apparatus comprising a pillow block housing having an end wall provided with an aperture therethrough, said end wall having a pair of radially inwardly extending ribs at said aperture, a nonrotatable seal assembly removably received in said aperture, said seal assembly including an annular body having a first end portion having a length corresponding generally to the thickness of said wall, said first end portion having two spaced grooves on its outer periphery, each groove receiving one of said annular ribs on said wall, a deformable sealing ring between the periphery of said body portion and said wall, said sealing ring being located between said grooves and being deformed due to contact with said first body portion and wall, means to prevent relative rotation between said housing and said seal assembly, the entirety of said second body portion being disposed to one side of said wall, the inner peripheral surface of said second body portion having a lubrication recess positioned between first and second seals, a lubrication fitting on said second body portion communicating with said recess, the inner diameter of said body being uniform and slightly greater than the inner diameter of said first and second seals.

9. Apparatus in accordance with claim 8 including a rotatable seal assembly having a pair of grooves on its outer periphery for receiving said ribs on said wall, said rotatable seal assembly being adapted to be substituted for said nonrotatable seal assembly when it is desired to convert said pillow block housing to have a rotatable seal and vice versa.

10. Apparatus in accordance with claim 8 wherein said wall has a passage therein, one end of said passage receiving said means to prevent relative rotation, the other end of said passage communicating with the interior of said housing.

11. Apparatus in accordance with claim 8 wherein said annular body is split into halves, and fastener means releasably connecting said halves together.

* * * * *